(12) United States Patent
Beacham, Jr.

(10) Patent No.: US 8,005,581 B2
(45) Date of Patent: Aug. 23, 2011

(54) SYSTEMS AND METHODS FOR COMMUNICATING AIRCRAFT DATA

(75) Inventor: William H. Beacham, Jr., Enfield, CT (US)

(73) Assignee: United Technologies Corp., Hartford, CT (US)

( * ) Notice: Subject to any disclaimer, the term of this patent is extended or adjusted under 35 U.S.C. 154(b) by 998 days.

(21) Appl. No.: 11/863,438

(22) Filed: Sep. 28, 2007

(65) Prior Publication Data

US 2010/0042289 A1 Feb. 18, 2010

(51) Int. Cl.
*G06F 19/00* (2006.01)

(52) U.S. Cl. .......................................................... 701/3

(58) Field of Classification Search .................. 701/1, 3, 701/14, 35–36; 702/127, 142, 144; 340/963, 340/945

See application file for complete search history.

(56) References Cited

U.S. PATENT DOCUMENTS

| | | | |
|---|---|---|---|
| 4,409,670 A | 10/1983 | Herndon et al. | |
| 4,470,116 A | 9/1984 | Ratchford | |
| 4,638,430 A | 1/1987 | Perra et al. | |
| 4,646,241 A | 2/1987 | Ratchford et al. | |
| 6,654,386 B2 * | 11/2003 | Nahapetian et al. | 370/474 |
| 6,816,728 B2 | 11/2004 | Igloi et al. | |
| 6,915,189 B2 | 7/2005 | Igloi et al. | |
| 6,990,319 B2 | 1/2006 | Wright et al. | |
| 7,069,147 B2 | 6/2006 | Manfred et al. | |
| 7,181,478 B1 | 2/2007 | Korson et al. | |
| 7,636,568 B2 * | 12/2009 | Gould et al. | 455/431 |
| 2003/0202527 A1 * | 10/2003 | Nahapetian et al. | 370/412 |
| 2006/0026185 A1 | 2/2006 | Lykken | |
| 2006/0069477 A1 | 3/2006 | Nahapetian | |
| 2007/0260374 A1 * | 11/2007 | Morrison et al. | 701/35 |

* cited by examiner

*Primary Examiner* — Yonel Beaulieu (57) ABSTRACT

Systems and methods for communicating aircraft data are provided. In this regard, a representative system includes a data reduction system operative to: receive aircraft data; store a first set of the aircraft data; analyze a next set of the aircraft data; and store the next set of the aircraft data if the next set of aircraft data differs from the first set of the aircraft data.

20 Claims, 6 Drawing Sheets

| TIMESTAMP | 1 | 2 | 3 | 4 | 5 | 6 | 7 | 8 |
|---|---|---|---|---|---|---|---|---|
| DATA | 1 | 1 | 1 | 0 | 0 | 0 | 0 | 1 |

AIRCRAFT DATA STREAM

| TIMESTAMP | 1 | 4 | 8 |
|---|---|---|---|
| DATA | 1 | 0 | 1 |

COMPRESSED DATA

SYSTEMS AND METHODS FOR COMMUNICATING AIRCRAFT DATA

BACKGROUND

1. Technical Field

The disclosure generally relates to data transmission.

2. Description of the Related Art

Modern commercial aircraft typically contain an Aircraft Condition Monitoring System (ACMS). An ACMS typically performs a variety of functions, such as acquiring data, computing current flight mode, and detecting the occurrence or non-occurrence of events. Additionally, an ACMS typically stores data for later analysis.

In this regard, data stored by an ACMS can be extracted using a portable unit that physically connects to an aircraft-mounted data interface. Notably, ground personnel oftentimes perform this procedure when the aircraft is located at an airport terminal gate. Thus, coordination of aircraft location and ground personnel scheduling is required. Alternatively, wireless communication can be used. However, excessive data download times can still be present due to the volume of stored data.

SUMMARY

Systems and methods for communicating aircraft data are provided. In this regard, an exemplary embodiment of a system comprises a data reduction system operative to: receive aircraft data; store a first set of the aircraft data; analyze a next set of the aircraft data; and store the next set of the aircraft data if the next set of aircraft data differs from the first set of the aircraft data.

An exemplary embodiment of a method for communicating aircraft data comprises: receiving aircraft data, the data comprising a series of time entries and corresponding performance information; storing a first of the time entries and corresponding performance information; analyzing a next of the time entries and corresponding performance information; storing the performance information corresponding to the next time entry if the performance information corresponding to the next time entry differs from the performance information corresponding to the first of the time entries; and not storing the performance information corresponding to the next time entry if the performance information corresponding to the next time entry does not differ from the performance information corresponding to the first of the time entries.

Other systems, methods, features and/or advantages of this disclosure will be or may become apparent to one with skill in the art upon examination of the following drawings and detailed description. It is intended that all such additional systems, methods, features and/or advantages be included within this description and be within the scope of the present disclosure.

BRIEF DESCRIPTION OF THE DRAWINGS

Many aspects of the disclosure can be better understood with reference to the following drawings. The components in the drawings are not necessarily to scale. Moreover, in the drawings, like reference numerals designate corresponding parts throughout the several views.

DETAILED DESCRIPTION

Systems and methods for communicating aircraft data are provided, several exemplary embodiments of which will be described in detail. In this regard, some embodiments are configured to disregard data that is duplicative, e.g., identical to data that has been previously stored, as data transmitted on aircraft data busses tends to be slow changing over an entire flight. In some embodiments, this involves recording a data set and then not recording a subsequent data set unless at least one of the data points between the sets differs. Notably, the decision to record or not to record data can be made in real-time (known as "data reduction"), with data compression optionally being performed on the stored data sets. Notably, in some embodiments, such data reduction can be performed at a data set level or individual parameter level, in line with normal application processing. This is in contrast to other forms of compression, which typically operate at the file level, and which are performed "after the fact" instead of inline as each parameter is being received.

Figure 1:
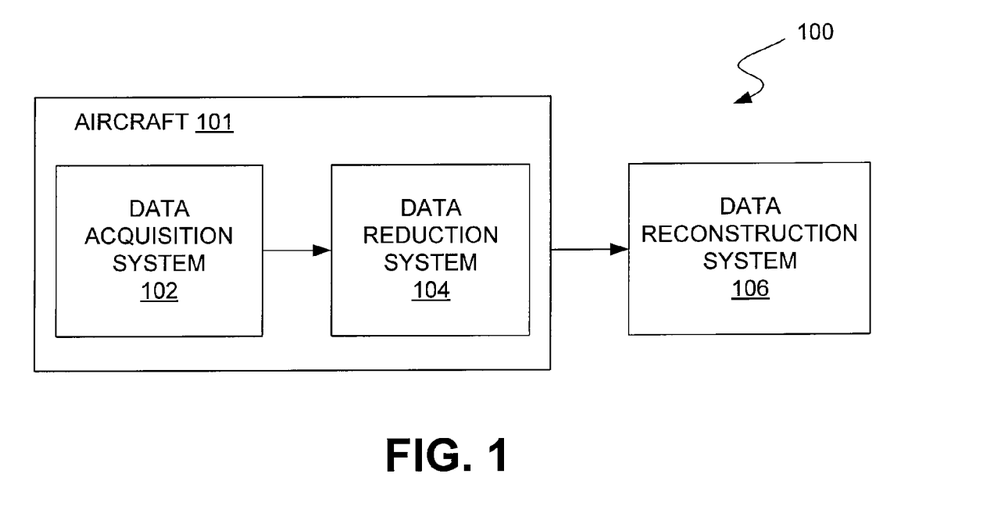
FIG. 1 is a schematic diagram depicting an exemplary embodiment of a system for communicating aircraft data.

In this regard, FIG. 1 is a schematic diagram depicting an exemplary embodiment of a system for communicating aircraft data. As shown in FIG. 1, system 100 includes several aircraft-based systems, including a data acquisition system 102 and a data reduction system 104. In operation, the data acquisition system acquires performance information related to aircraft 101, e.g., operating parameters. Data acquisition system 102 communicates this information to data reduction system 104, which analyzes the information and determines which of the information is to be stored. By way of example, the data reduction system can be configured to record only time-varying data provided from the data acquisition system. With respect to recording, such recording can involve saving the data to a data storage device, such as to a hard drive.

System 100 also incorporates a data reconstruction system 106. In this embodiment, the data reconstruction system is part of a ground-based system that is used for storage and/or analysis of aircraft data. In operation, the data reconstruction system receives information output from the data reduction system. Notably, in some embodiments, transmission of the information from the data reduction system to the data reconstruction system can occur directly, whereas other embodiments can use one or more of various communication networks that may include one or more wired or wireless interfaces.

After the information provided from the data reduction system is accessed, the data reconstruction system can reconstruct the data such that no loss of the originally acquired aircraft data is evident. Notably, this can involve reconstituting those fields that were omitted from storage by the data reduction system due to being duplicative, for example. Analysis of the aircraft data can then be performed, such as to conduct trend analysis of various aircraft systems/components.

Figure 2:
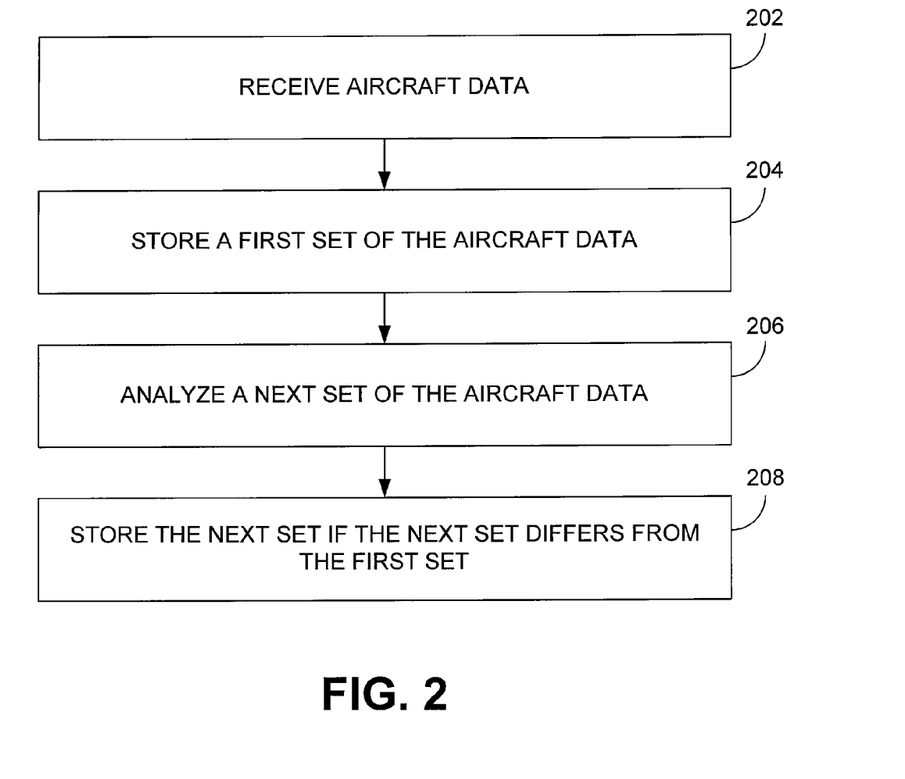
FIG. 2 is a flowchart depicting functionality of an embodiment of system for communicating aircraft data.

FIG. 2 is a flowchart depicting functionality of an embodiment of a data reduction system. As shown in FIG. 2, the functionality (or method) may be construed as beginning at block 202, in which aircraft data is received. By way of example, the aircraft data can include various information, such as time-stamped performance information regarding one or more of various aircraft systems and/or aircraft operating parameters. In block 204, a first set of the aircraft data is stored. Thereafter, such as depicted in block 206, a next set of the aircraft data is analyzed. If the next set of aircraft data differs from the first set of aircraft data, then the next set of aircraft data is stored such as depicted in block 208. Clearly, if the data is time-stamped, the time component will likely vary from data set to data set; however, timestamp information can be disregarded for the purpose of determining whether the next set of aircraft data should be stored. Notably, in some embodiments, timestamp information can be stored regardless of whether or not the corresponding data fields differ. As such, the stored timestamps can function as placeholders for facilitating identification of data that has not been stored. In some embodiments, first and last samples of parameters are stored and used to determine if a parameter stream stops. Notably, this can function as a form of error detection.

Figure 3:
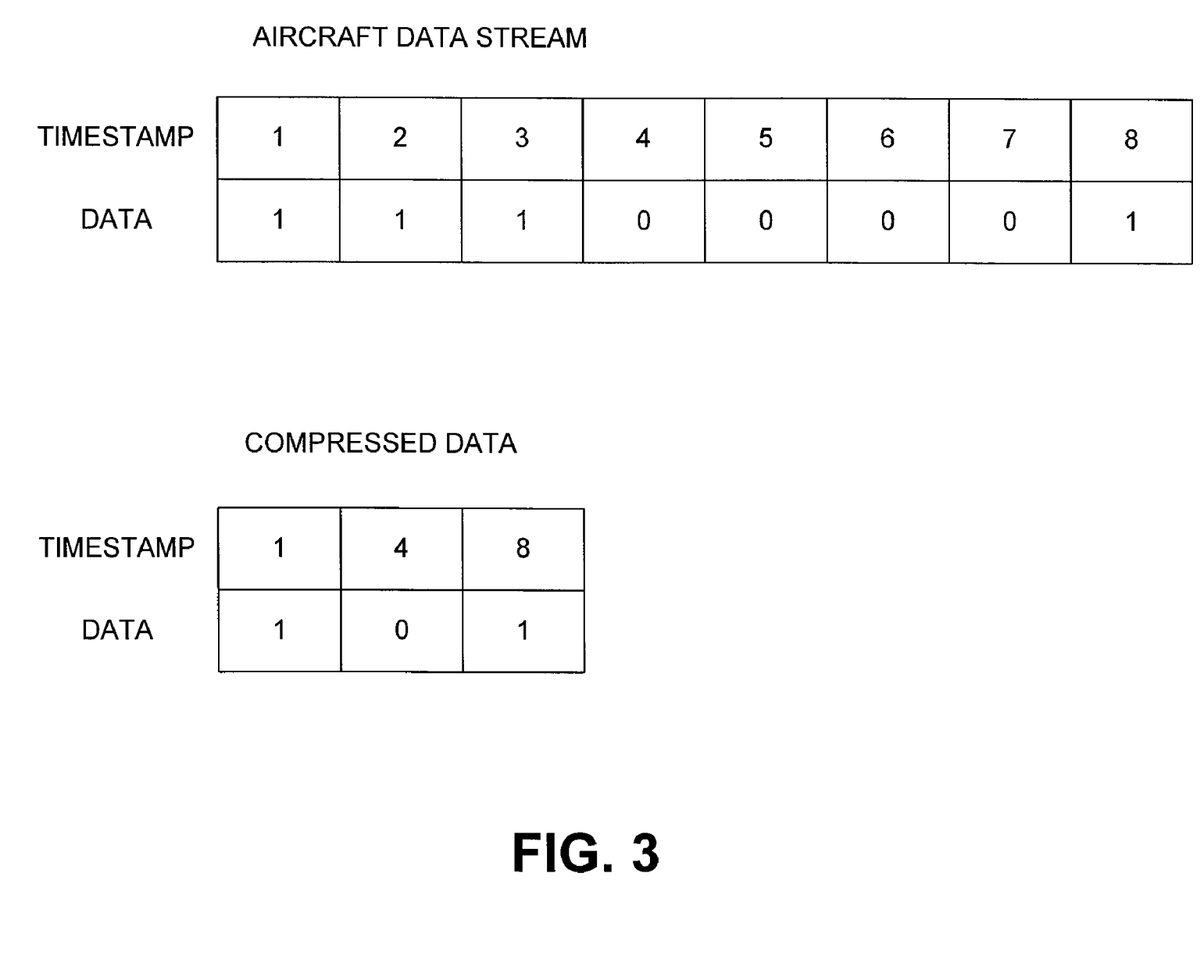
FIG. 3 is a schematic diagram depicting an exemplary embodiment of a data format.

FIG. 3 is a schematic diagram depicting representative data formats that can be input and output by an embodiment of a data reduction system. As shown in FIG. 3, the upper table depicts a representative aircraft data stream as received by an embodiment of a data reduction system. Note that this data includes a series of timestamp fields and corresponding data fields. Although only one such data field is presented per unit time, multiple data entries could be provided per each unit time.

In contrast, the lower data table depicts aircraft data after being altered (i.e., subjected to data reduction) by the data reduction system. Notably, the eight (8) data frames present in the original data stream have been reduced to three (3) data frames. Specifically, data corresponding to original time entries 2, 3, 5, 6 and 7 have been deleted, i.e., not stored to memory. This is because each of frames 1, 4 and 8 represents a new set of data, e.g., the data in the frame differs from that of an immediately preceding frame. With respect to frame 1, this is the case because there is no immediately preceding frame. Note also that even though data corresponding to time 8 has been stored since this data represents a change from the data acquired in frame 7, since frame 8 represents the last frame in which data was acquired, some embodiments also could be configured to record this frame regardless of whether or not the data contained in that frame represents a change over the immediately preceding frame. As should be evident from the exemplary embodiment above, some implementations require relatively little computing power and a small footprint.

Figure 4:
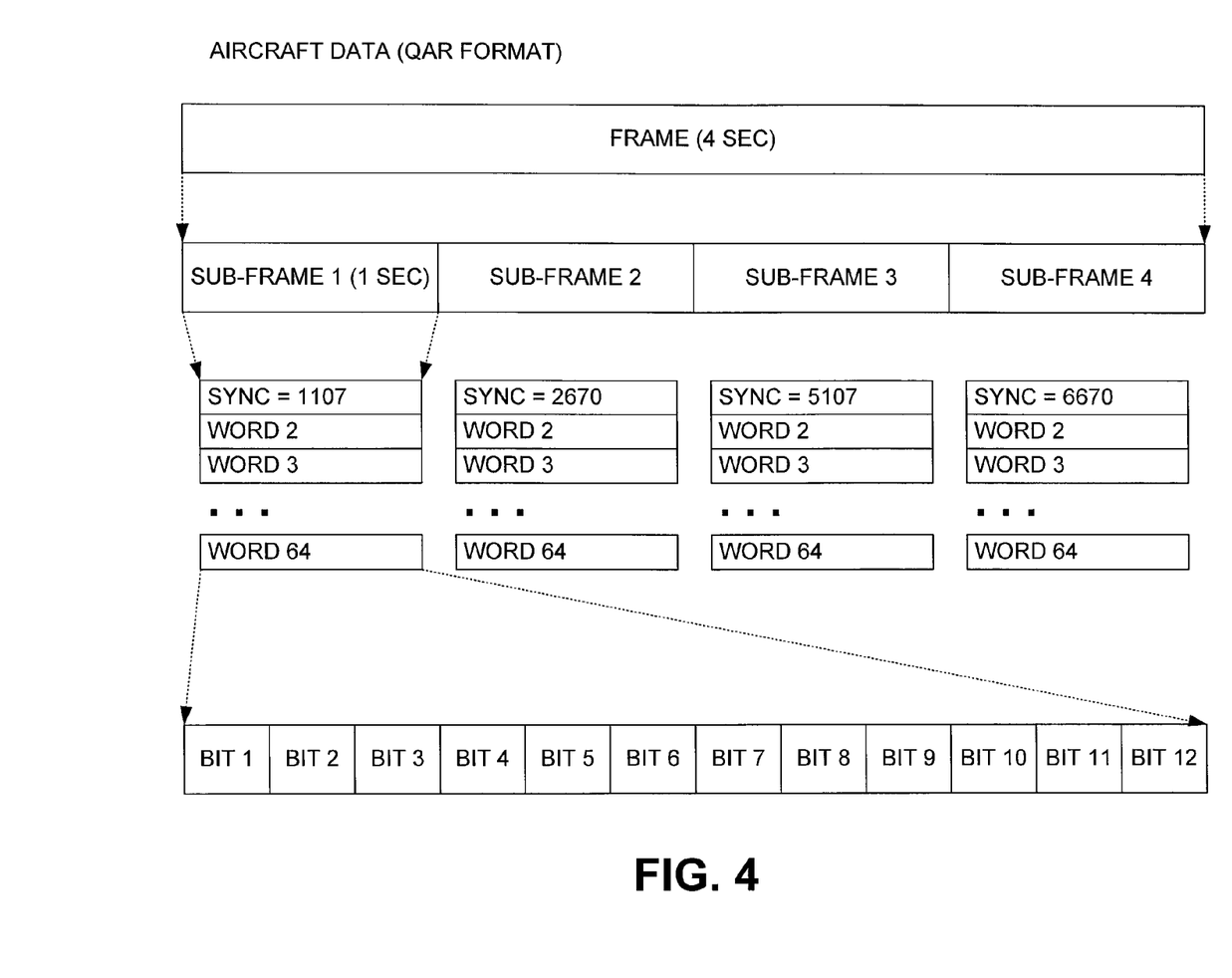
FIG. 4 is a schematic diagram depicting another embodiment for a data format.

FIG. 4 is a schematic diagram depicting another embodiment of a data format that can be used by a data reduction system. In this regard, aircraft data associated with this embodiment is provided in an ARINC 717 quick access recorder (QAR) format. Notably, each parameter in a QAR data stream is represented by a 12-bit serial data word. An example of such a word is word 64 of sub-frame 1 of the depicted frame.

Since memory is typically byte-oriented, each parameter consumes 16 bits when stored in memory. In this regard, the upper 4 bits of the 16 bits stored parameter can be used as a cyclical counter (or word slot indicator) that maintains position information in the data stream. Thus, with respect to data reduction, the first word in each one-second sub-frame contains a sub-frame indicator that defines the sub-frame. In such an embodiment, the first word can have the upper 4 bits set to zero. Each subsequent word could then increment the frame indicator by one. Thus, when the counter reaches full count, the counter can rolls back to zero.

With position information being carried by the upper 4 bits, for each word slot in a one-second sub-frame, the remaining 12-bit value can be compared to the value received in the previous one-second sub-frame with the same sub-frame indicator. If the value is the same, then the word slot is not recorded. However, if the value is not the same, indicating a change in the data, the word slot is recorded. Notably, in this embodiment, each word with an upper 4 bit (counter) value of zero should be stored by default.

During reconstruction of the data, the upper 4 bits are monitored. Responsive to detecting a missing position, the 12-bit value of the previous identical sub-frame can be used to fill the word slot.

Figure 5:
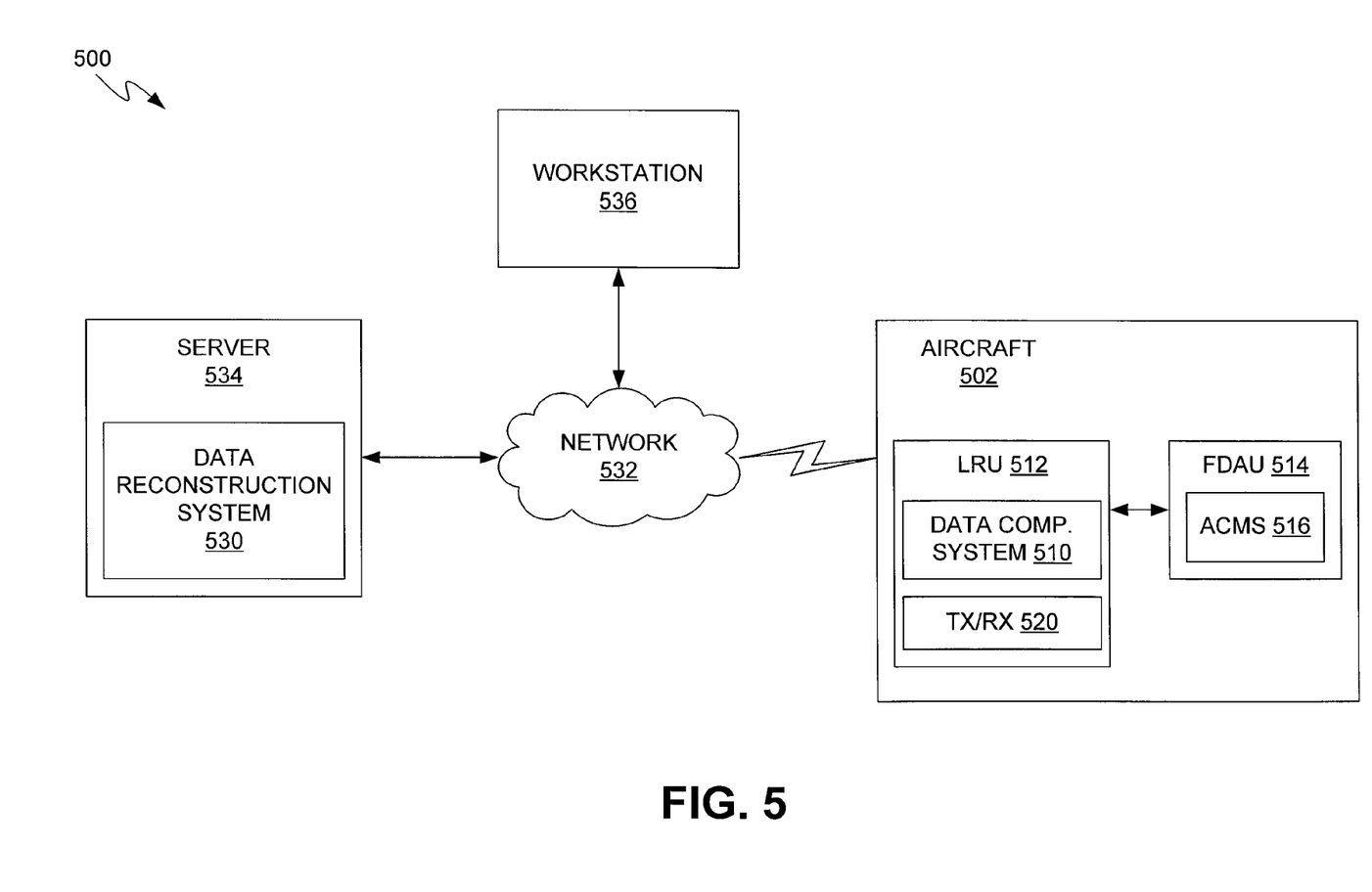
FIG. 5 is a schematic diagram depicting another embodiment of a system for communicating aircraft data.

FIG. 5 is a schematic diagram depicting another exemplary embodiment of a system for communicating aircraft data. As shown in FIG. 5, the system 500 incorporates an aircraft 502 and associated systems that are carried onboard the aircraft. Specifically, the aircraft mounts a data reduction system 510, which is associated with a wireless communication capability facilitated by a line replaceable unit (LRU).

In this embodiment, the LRU is a Dual-Architecture Microserver 512 that functions, in pertinent part, as a communication interface for a Flight Data Acquisition Unit (FDAU) 514, which incorporates ACMS functionality 516. Specifically, the Dual-Architecture Microserver LRU is communicatively coupled to the FDAU, such as by a wired connection, and includes a wireless transceiver 520 capable of communicating with a wireless network. More information on exemplary embodiments of Dual-Architecture Microserver LRUs can be found in U.S. Patent Publication 2003/0105565, which is incorporated by reference herein.

In operation, the FDAU acquires aircraft data, which can be accessed via a data bus, and provides at least some of the data to the data reduction system (e.g., data in an ARINC 717 QAR data format or ARINC 429 format). The data reduction system reduces the amount of data, such as by recording only that data which is non-duplicative of preceding instances of that data. Additionally or alternatively, one or more of various data compression algorithms can be used to compress the data, such as by using a commercially available compression algorithm, e.g., WINZIP®.

Responsive to one or more stimuli (e.g., a query from a data reconstruction system or occurrence of an event, such as aircraft landing), data can be provided from the data reduction system. In the embodiment of FIG. 5, this involves wireless transmission of the data via transceiver 520 so that the data can be accessed by data reconstruction system 530. It should be noted that communication of the data is facilitated by a communication network 532. Although communication network 532 can comprise one or more networks and/or network types, in this embodiment, at least the portion of the communication network that provides the direct interface with the aircraft involves wireless communication, e.g., cellular or 802.11.

In the embodiment of FIG. 5, data reconstruction system 530 is resident in a server 534. The data reconstruction system receives the data provided by the data reduction system and reconstitutes the data. That is, the data is transformed such that no loss of data is evident when compared to the data as originally acquired and provided to the data reduction system. As should be understood, when the data has been compressed by a compression algorithm, reconstitution of the data can involve decompressing the data with a corresponding decompression algorithm. As also shown in FIG. 3, the data can be accessed via a workstation (e.g., workstation 536) for performing analysis of the data (e.g., trend analysis).

Figure 6:
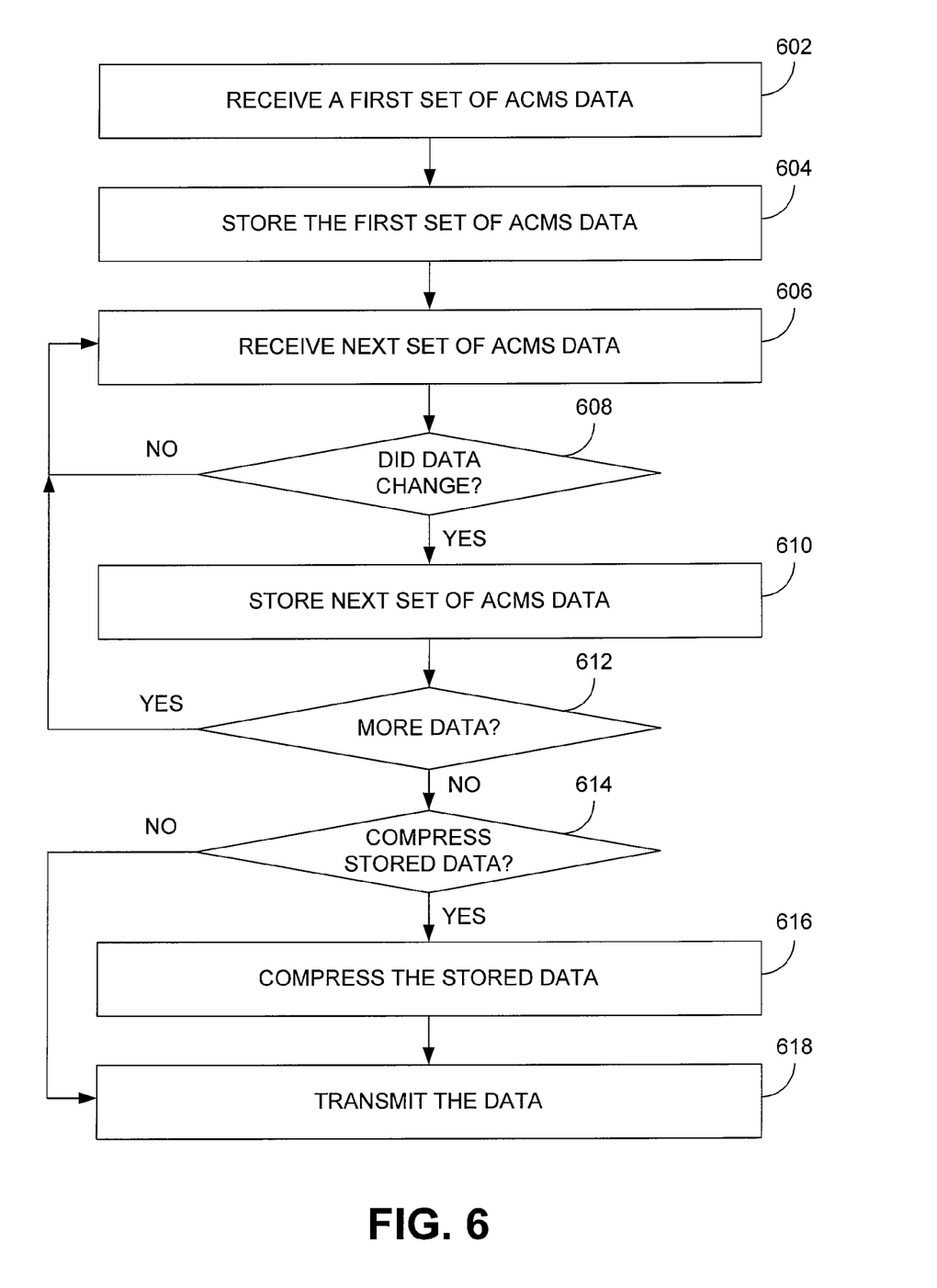
FIG. 6 is a flowchart depicting functionality of the embodiment of the data reduction system of FIG. 5.

A flowchart depicting functionality of the embodiment of the data reduction system of FIG. 5 is presented in FIG. 6. As shown in FIG. 6, the functionality (or method) may be construed as beginning at block 602, in which a first set of ACMS data is received. In block 604, the first set of ACMS data is stored. Then, in block 606, a next set of ACMS data is received. Thereafter, such as depicted in block 608, a determination is made as to whether the data changed between the first set and the next set. If at least one of the data points of the next data set has changed, the process may proceed to block 610, in which at least the changed data point is stored. In some embodiments, this can involve storing the entire data set. If however, the data has not changed, the process may return to block 606 and proceed as described before.

In block 612, a determination is made as to whether any more data is available. If more data is available, the process may return to block 606 and proceed as described before. However, if more data is not available, the process may proceed to block 614, in which a determination is made regarding compression of the stored data. If the stored data is to be compressed, the process may proceed to block 616, in which the stored data is compressed. In some embodiments, this can be accomplished using a compression algorithm to further reduce the amount of data. Then, as depicted in block 618, the data is transmitted, such as via wireless communication for use by a data reconstruction system. Note also that the process may proceed to block 618 responsive to determining that compression is not to take place.

Figure 7:
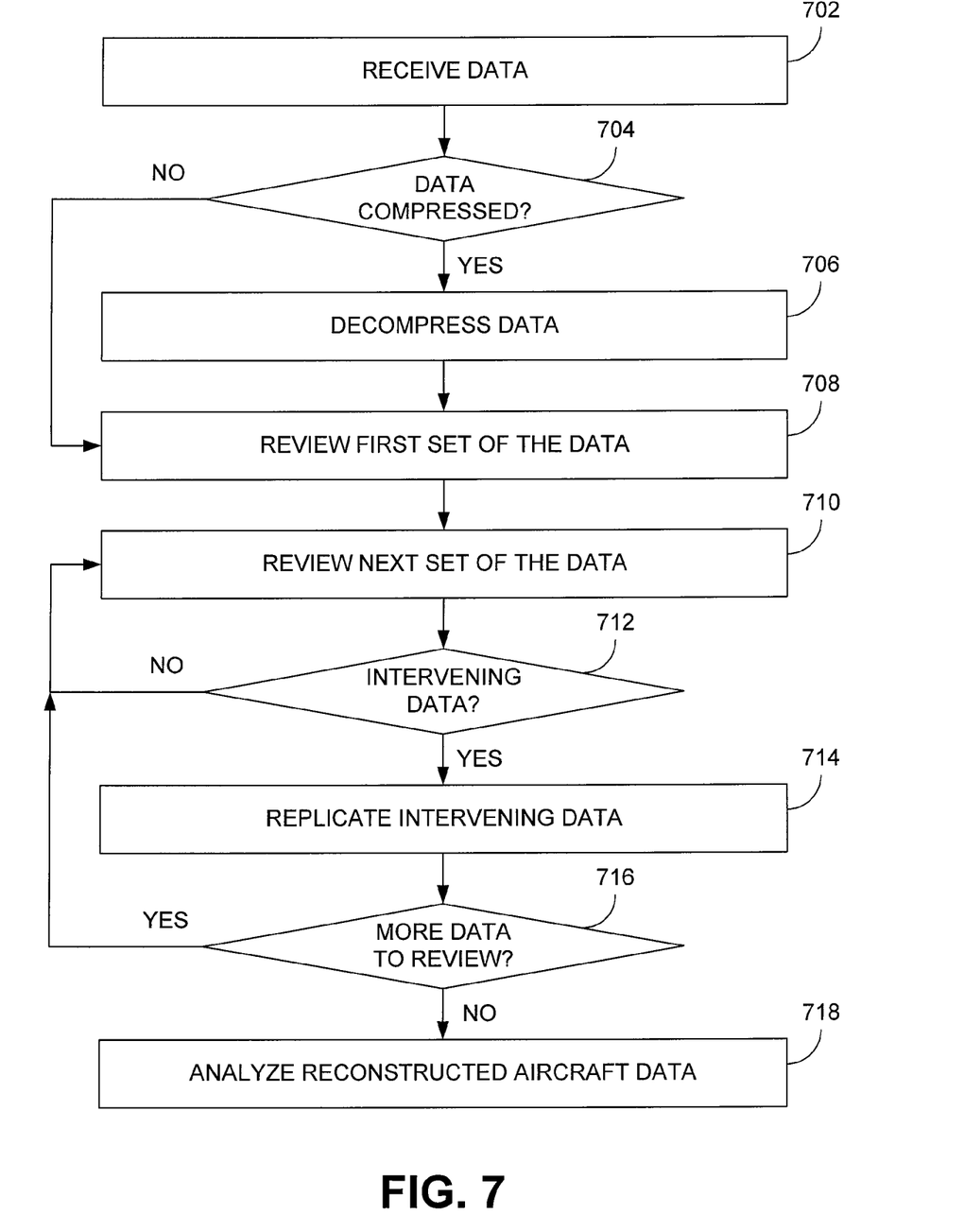
FIG. 7 is a flowchart depicting functionality of the embodiment of the data reconstruction system of FIG. 5.

FIG. 7 is a flowchart depicting functionality of the embodiment of the data reconstruction system of FIG. 5. As shown in FIG. 7, the functionality of (or method) may be construed as beginning at block 702, in which data is received, e.g., data provided by a data reduction system. In block 704, a determination is made as to whether the received data is compressed. In this regard, "compressed" refers to compression by a compression algorithm other than that involved in data reduction. If the data is compressed the process proceeds to block 706, in which the data is decompressed, after which the process proceeds to block 708. Notably, the process may also proceed to block 708 responsive to determining that the data is not compressed.

In block 708, a first set of the data is reviewed. Then, as depicted in block 710, a next set of the data is reviewed. In block 712, a determination is made regarding whether any intervening data should be present between the first and next data sets. If it is determined that intervening data should be present, such as could be indicated by empty word slots, the process may proceed to block 714, in which the intervening data is replicated, thereby expanding the data to the original format. By way of example, the immediately first (immediately preceding) data set can be copied and used to fill the data fields for any identified intervening data sets, thereby reconstituting the aircraft data without data loss. If, however, no intervening data is identified, the process may return to block 710, in which another next set of data is reviewed. After any intervening data has been replicated, the process may proceed to block 716, in which a determination is made regarding the presence of any additional data. If it is determined that there is additional data to review, the process may return to block 710 and proceed as described before. If, however, there is no additional data, the process may proceed to block 718, in which the reconstructed aircraft data can be analyzed.

Various functionality, such as that described above in the flowcharts, can be implemented in hardware and/or software.

In this regard, a computing device can be used to implement various functionality, such as the functionality depicted in FIGS. 2, 6 and 7.

In terms of hardware architecture, such a computing device can include a processor, memory, and one or more input and/or output (I/O) device interface(s) that are communicatively coupled via a local interface. The local interface can include, for example but not limited to, one or more buses and/or other wired or wireless connections. The local interface may have additional elements, which are omitted for simplicity, such as controllers, buffers (caches), drivers, repeaters, and receivers to enable communications. Further, the local interface may include address, control, and/or data connections to enable appropriate communications among the aforementioned components.

The processor may be a hardware device for executing software, particularly software stored in memory. The processor can be a custom made or commercially available processor, a central processing unit (CPU), an auxiliary processor among several processors associated with the computing device, a semiconductor based microprocessor (in the form of a microchip or chip set) or generally any device for executing software instructions.

The memory can include any one or combination of volatile memory elements (e.g., random access memory (RAM, such as DRAM, SRAM, SDRAM, VRAM, etc.)) and/or nonvolatile memory elements (e.g., ROM, hard drive, tape, CD-ROM, FLASH, etc.). Moreover, the memory may incorporate electronic, magnetic, optical, and/or other types of storage media. Note that the memory can also have a distributed architecture, where various components are situated remotely from one another, but can be accessed by the processor.

The software in the memory may include one or more separate programs, each of which includes an ordered listing of executable instructions for implementing logical functions. A system component embodied as software may also be construed as a source program, executable program (object code), script, or any other entity comprising a set of instructions to be performed. When constructed as a source program, the program is translated via a compiler, assembler, interpreter, or the like, which may or may not be included within the memory.

The Input/Output devices that may be coupled to system I/O Interface(s) may include input devices, for example but not limited to, a keyboard, mouse, scanner, microphone, camera, proximity device, etc. Further, the Input/Output devices may also include output devices, for example but not limited to, a printer, display, etc. Finally, the Input/Output devices may further include devices that communicate both as inputs and outputs, for instance but not limited to, a modulator/demodulator (modem; for accessing another device, system, or network), a radio frequency (RF) or other transceiver, a telephonic interface, a bridge, a router, etc.

When the computing device is in operation, the processor can be configured to execute software stored within the memory, to communicate data to and from the memory, and to generally control operations of the computing device pursuant to the software. Software in memory, in whole or in part, is read by the processor, perhaps buffered within the processor, and then executed.

One should note that the flowcharts included herein show the architecture, functionality, and operation of a possible implementation of software. In this regard, each block can be interpreted to represent a module, segment, or portion of code, which comprises one or more executable instructions for implementing the specified logical function(s). It should also be noted that in some alternative implementations, the functions noted in the blocks may occur out of the order and/or not at all. For example, two blocks shown in succession may in fact be executed substantially concurrently or the blocks may sometimes be executed in the reverse order, depending upon the functionality involved.

One should note that any of the functionality described herein can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" contains, stores, communicates, propagates and/or transports the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a nonexhaustive list) of a computer-readable medium include a portable computer diskette (magnetic), a random access memory (RAM) (electronic), a read-only memory (ROM) (electronic), an erasable programmable read-only memory (EPROM or Flash memory) (electronic), and a portable compact disc read-only memory (CDROM) (optical).

It should be emphasized that the above-described embodiments are merely possible examples of implementations set forth for a clear understanding of the principles of this disclosure. Many variations and modifications may be made to the above-described embodiments without departing substantially from the spirit and principles of the disclosure. All such modifications and variations are intended to be included herein within the scope of this disclosure and protected by the accompanying claims.

The invention claimed is:

1. A method for communicating aircraft data comprising:
   receiving aircraft data, the data comprising a series of time entries and corresponding performance information;
   storing a first of the time entries and corresponding performance information;
   analyzing a next of the time entries and corresponding performance information;
   storing the performance information corresponding to the next time entry if the performance information corresponding to the next time entry differs from the performance information corresponding to the first of the time entries;
   not storing the performance information corresponding to the next time entry if the performance information corresponding to the next time entry does not differ from the performance information corresponding to the first of the time entries; and
   transmitting the stored performance information portion of the aircraft data with a transmitter.

2. The method of claim 1, further comprising also not storing the next time entry if the performance information corresponding to the next time entry does not differ from the performance information corresponding to the first of the time entries.

3. The method of claim 1, further comprising performing data compression on the stored performance information.

4. The method of claim 1, wherein, in receiving the aircraft data, the aircraft data is provided by an Aircraft Condition Monitoring System (ACMS).

5. The method of claim 4, wherein the stored performance information is wirelessly transmitted by the transmitter.

6. The method of claim 5, further comprising reconstructing the aircraft data using the performance information communicated via the transmitter.

7. The method of claim 1, wherein receiving the aircraft data is performed onboard the aircraft.

8. The method of claim 1, further comprising storing the performance information corresponding to the next time entry regardless of whether or not the performance information corresponding to the next time entry differs from the performance information corresponding to the first of the time entries if the next time entry is the last time entry.

9. The method of claim 1, further comprising performing trend analysis on the performance information.

10. A system for communicating aircraft data comprising:
    a data reduction system operative to:
      receive aircraft data;
      store a first set of the aircraft data;
      analyze a next set of the aircraft data; and
      store the next set of the aircraft data if the next set of aircraft data differs from the first set of the aircraft data; and
    a transmitter operative to transmit the stored aircraft data.

11. The system of claim 10, wherein the aircraft data is provided by an Aircraft Condition Monitoring System (ACMS).

12. The system of claim 11, wherein:
    the system further comprises a flight data analysis unit (FDAU) operative to perform ACMS functionality; and
    the data reduction system is operative to receive the aircraft data from the FDAU.

13. The system of claim 10, wherein the data reduction system is resident in a line replaceable unit (LRU).

14. The system of claim 13, wherein the transmitter is operative to wirelessly transmit the stored aircraft data.

15. The system of claim 14, wherein the transmitter is incorporated into the LRU.

16. The system of claim 10, wherein the data reduction system is operative to receive the aircraft data in an ARINC 717 quick access recorder (QAR) data format.

17. The system of claim 10, further comprising a data reconstruction system operative to reconstruct the aircraft data from performance information.

18. The system of claim 17, wherein the data reconstruction system is operative to decompress the performance information responsive to determining that the performance information is compressed.

19. The system of claim 10, wherein the data reduction system is operative to receive the aircraft data via a data bus resident on the aircraft.

20. The system of claim 19, wherein the data reduction system is operative to receive the aircraft data via an ARINC 429 data bus.

* * * * *